March 29, 1960  T. F. HURSEN  2,930,572
PULSATION DAMPENER FOR USE WITH SAFETY VALVES
Filed Oct. 8, 1957

INVENTOR.
Thomas F Hursen
BY Adelbert A. Steinmiller
Attorney

United States Patent Office 2,930,572
Patented Mar. 29, 1960

2,930,572

PULSATION DAMPENER FOR USE WITH SAFETY VALVES

Thomas F. Hursen, Monroeville, Pa., assignor to Westinghouse Air Brake Company, Wilmerding, Pa., a corporation of Pennsylvania Application October 8, 1957, Serial No. 688,906

3 Claims. (Cl. 251—117)

This invention relates to pulsation dampening devices and more particularly to a device to dampen or absorb transient pressure rises or surges in a fluid pressure conduit leading to a safety valve, to prevent undesired operation of the safety valve.

In a system for supplying fluid under pressure, some form of fluid compressing means is employed to generate the fluid pressure. This compressing means, particularly a reciprocating pump, for example, may cause transient pressure rises or pressure surges that are higher than the mean pressure in the system. If a safety or relief valve is employed in the system to protect it from excess pressure build-up, the surge pressure may at times momentarily exceed the pressure setting of the safety valve causing it to open. If the mean system pressure is close to or approximately the pressure setting of the safety valve, the safety valve conceivably will open at every compression stroke of the compressor and close as soon as the surge has passed. This rapid intermittent opening and closing of the safety valve will cause unnecessary and excessive wear of the valve as well as reduce the efficiency of the entire system.

These pulsations or surges can be successfully dampened if a restriction, such as an orifice or choke, is placed in the conduit leading from the source of supply to the safety valve. But such a restriction also has the disadvantage of restricting the venting of fluid under pressure from the system via the safety valve when the mean pressure therein becomes excessive, to such a degree as to prevent rapid and effective dissipation of such excessive pressure and thereby render the safety valve ineffective for averting possible damage. That is, in large volume systems having a high capacity compressor, the restriction may not permit relief of the pressure fast enough to avert damage due to excessive pressure build-up.

Accordingly, it is an object of this invention to provide a pulsation dampening device for use with a safety valve in such a manner that the normal, efficient operation of the safety valve is not impaired.

It is another object of this invention to provide, for use in a fluid pressure system equipped with a safety valve, a device for preventing pressure surges from unnecessarily operating the safety valve as well as rapidly exhausting the system of excess pressure.

It is a still further object of this invention to provide a pulsation dampening device for use with a safety valve in which dampening device a restriction is employed to dampen out pressure surges and in which is also provided a valve automatically operative to bypass the restriction when the safety valve opens due to excessive mean pressure in the system.

The novel features that I considered characteristic of my invention are set forth in the appended claims; the invention itself, however, both as to its organization and method of operation, together with additional objects and advantages thereof, will best be understood from the following description of the specific embodiment when read in conjunction with the accompanying drawings in which:

Description

Figure 1:
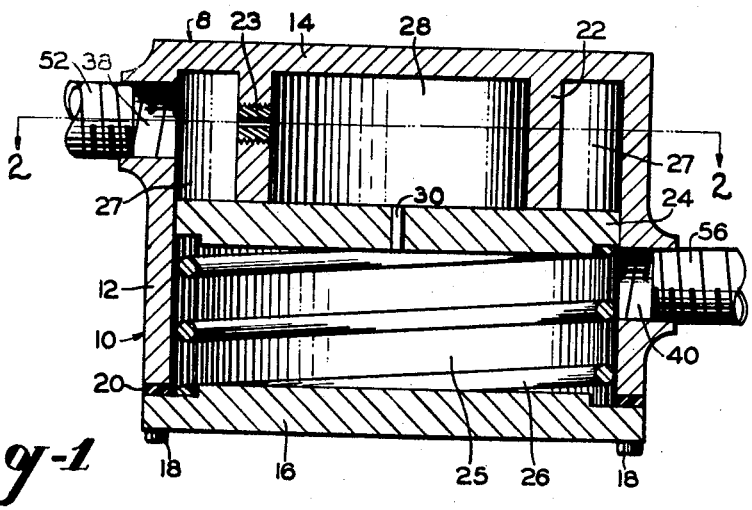
Fig. 1 is a sectional elevation view of the pulsation dampener.
Figure 2:
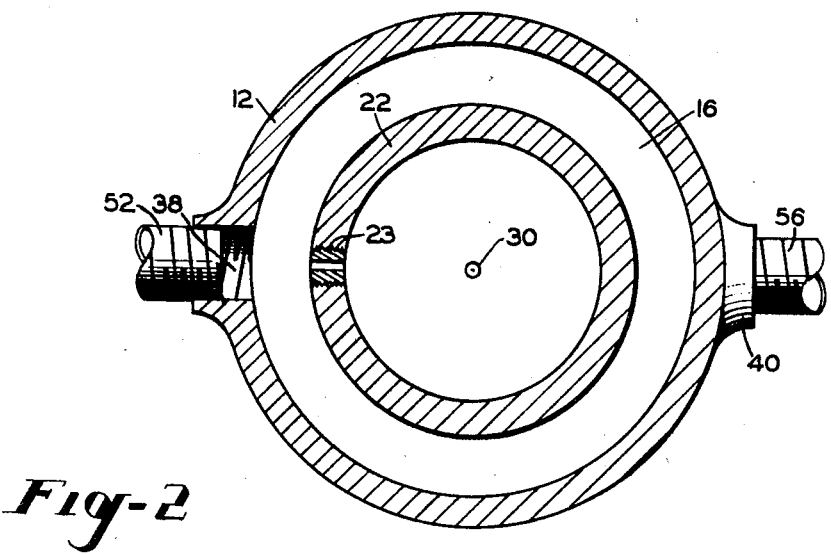
Fig. 2 is a sectional view, taken along line 2—2 of Fig. 1.

The pulsation dampener is generally indicated by the reference numeral 8. There is a housing, generally indicated by reference numeral 10, consisting of a cylindrical side wall 12 and an integral end wall 14. A removable end wall or plate 16 is located at the other end of the side wall and is secured thereto as by means of a plurality of bolts 18. A gasket 20 is provided between the removable end wall 16 and the side wall 12 to form a fluid seal.

Within the housing there is a cylindrical partition 22 formed integrally with the end wall 14 and extending concentrically therefrom for a portion of the length of the housing. Located in the partition 22 is a replaceable orifice or choke fitting 23 providing a restricted passage therethrough. Also located within the housing is a valve plate 24, which cooperates therewith to divide the housing into two oppositely arranged compartments, one of said compartments comprising an outlet chamber 25 adjacent the side of said valve plate facing end wall 16.

A compression spring 26 is compressed in chamber 25 between the valve plate 24 and the removable end wall 16 for biasing the valve plate toward a normal position in engagement with the annular-shaped free end of partition 22. When in this normal position, the valve plate 24 cooperates with the housing and partition 22 to divide the compartment opposite the outlet chamber 25 into an annular inlet chamber 27 surrounding said partition and a control chamber 28 within said partition, both said chambers being on the side of valve plate 24 opposite outlet chamber 25.

The valve plate 24 has an orifice 30 therethrough to provide communication between control chamber 28 and outlet chamber 25 and the safety valve device 54 in order that the pressure of fluid acting at the safety valve will correspond to the pressure of fluid in chamber 28 and normally in chamber 27. The side wall 12 is provided with a fluid inlet 38 communicating with inlet chamber 27 and a fluid outlet 40 communicating with outlet chamber 25.

Figure 3:
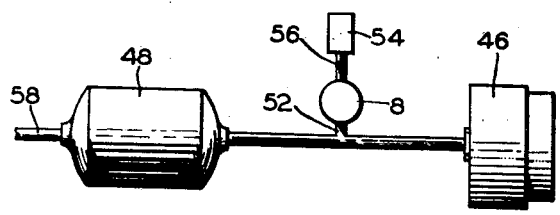
Fig. 3 is a schematic representation of a fluid pressure system showing the manner of use of the pulsation dampener.

Referring to Fig. 3, which is a schematic representation of a system for supplying fluid under pressure, a fluid compressor is indicated at 46 having its outlet communicating with a storage reservoir 48 by means of a conduit 50. Conduit 50, intermediate the compressor 46 and reservoir 48, has a branch conduit 52 leading therefrom and connected to the inlet 38 of the pulsation dampener 8. The fluid outlet 40 of pulsation dampener 8 is connected to a safety valve 54 by a conduit 56. The outlet side of reservoir 48 is connected to a fluid pressure consuming device (not shown) by means of a conduit 58.

Operation

Referring now to the several figures of the drawing, it will be noted that the system mean pressure will be communicated to the safety valve 54 by way of conduit 52 through annular chamber 27, orifice 23, control chamber 28, orifice 30, chamber 25, outlet 40 and conduit 56. If the mean pressure in the system is below the opening pressure setting of the safety valve 54, substantially equal total pressure will be applied to both sides of the valve plate 24. During quiescent periods, when no pulsations or surges are present and the mean pressure in the system is below the opening pressure setting of the safety valve, spring 28 will maintain the valve plate 26 firmly seated against the free end of partition 22. When pulsations or surges occur in the system, this pressure rise will only affect the annular area of the valve plate 24 that is exposed to the annular pressure chamber 27, since the restricted orifice 23 will prevent any appreciable momentary build-up of pressure in chamber 28 and therefore at the safety valve device 54. Spring 26, therefore, will be effective for maintaing valve plate 24 seated against the free end of partition 22. Thus momentary pressure surges or pulsations become dissipated before they have any effect on the operation of the relief valve 54.

On the other hand, if fluid pressure build-up in the system, and therefore in chamber 27, is gradual in nature, the orifice 23 will not be effective for preventing such build-up in chamber 28, so that equalization of fluid pressure will occur in both said chambers and will, therefore, be effective over the entire area of valve plate 24 adjacent chambers 27 and 28 and at the same time will build up at the safety valve device 54. When such build-up of pressure exceeds the setting of the safety valve, the latter will operate in the well-known manner to relieve such excessive pressure. When the fluid pressure in chamber 25 is thus rapidly reduced, the pressure acting over entire area of valve plate 24 will be effective to overcome the opposing force of spring 26, which is of predetermined compression value compatible with the relief pressure setting of the safety valve 54, and valve plate 24 will be moved downwardly, as viewed in the drawing, to what may be called a pressure release position past outlet 40 to permit fluid at excessive pressure to flow unobstructedly from inlet 50, past valve plate 24, to conduit 56 and out through safety valve 54 to relieve the excessive fluid pressure in the system until the system pressure is reduced to a safe mean presusre, at which time the safety valve operates to cut off further relief of fluid pressure from the system.

Upon cutoff of relief of fluid pressure from the system by the safety valve 54, spring 26, along with gradual build-up of fluid pressure in chamber 25 through passageway 30, is effective for restoring valve plate 24 to its normal position in which unobstructed communication between inlet 38 and outlet 40 and between chambers 27 and 28 is cut off until subsequent operation of said safety valve to relieve the system of excessive fluid pressure.

Having now described the invention, what I claim as new and desire to secure by Letters Patent, is:

1. A pulsation dampener device for absorbing and dissipating momentary pressure surges which may occur in a fluid pressure sysem including a source of fluid under pressure, said pulsation dampener device comprising, in combination, a housing having a fluid pressure inlet and a fluid pressure outlet, said housing having therein a pressure chamber into which said inlet opens for admitting fluid under pressure thereinto, a control chamber, and an outlet chamber out of which said fluid pressure outlet opens, said control chamber being in communication with said pressure chamber through a first restricted passage through which pressure in said pressure chamber may equalize at a slow rate into said control chamber but so restricted as to prevent momentary pressure surges occurring in the pressure chamber from reaching the control chamber, and valve means biased toward a normal position, in which sole communication between said pressure chamber and said control chamber is through said restricted passage, and in which normal position said valve means is subjected on one side to the combined pressures of fluid present in both said pressure and control chambers, the opposite side of said valve being subjected to the pressure fluid in said outlet chamber, said outlet and control chambers being in communication with each other through a second restricted passage formed in said valve means and through which equalization of fluid pressure on opposite sides of said valve means may occur at a slow rate, said valve means being movable, in response to a pressure differential between the two sides thereof upon rapid reduction of fluid pressure in said outlet chamber through said outlet to a second position in which communication of relatively large capacity is established between said inlet and said outlet.

2. A pulsation dampener device for absorbing and dissipating momentary pressure surges which may occur in a fluid pressure system including a source of fluid under pressure, said pulsation dampener device comprising, in combination, a housing, a movable valve plate cooperating with said housing to form therein a first compartment and second compartment, the latter comprising a fluid pressure outlet chamber having an outlet through which fluid pressure may be reduced in said outlet chamber, a partition disposed in said first compartment and cooperating with said valve plate, when the latter is in a normal position in engagement with said partition, for further dividing said first compartment into a control member and a fluid pressure inlet chamber, the latter having an inlet for admitting fluid under pressure thereinto and both said control chamber and said inlet chamber being separated from said outlet chamber by said valve plate, said partition having therein a restricted passageway by which constant restricted communication is provided between said inlet chamber and said control chamber, said valve plate having a passageway therein to provide communication between opposite sides of the plate but so situated as to establish communication between said control chamber and said outlet chamber when said valve plate is in its normal position and therefore provide restricted communication between said inlet chamber and said outlet chamber through the control chamber, and biasing means for urging said valve plate towards its normal position and being yieldable to a fluid pressure differential acting on said valve plate in excess of a predetermined degree upon rapid reduction of fluid pressure in the outlet chamber to relieve fluid pressure from the system, whereby said valve plate is moved to a pressure release position in which it establishes communication of relatively large capacity between said inlet chamber and said outlet chamber.

3. A pulsation dampener device for absorbing and dissipating momentary pressure surges which may occur in a fluid pressure system including a source of fluid under pressure, said dampener device comprising, in combination, a substantially cylindrical casing closed at one end by an integral wall and at the opposite end by a removable end wall, a cylindrical partition of smaller diameter than said casing and extending coaxially and internally of said casing away from said integral wall toward said removable end wall but terminating with an annular free end at a point intermediate said integral wall and said removable end wall, a circular valve plate having sliding contact with the inner cylindrical surfaces of said casing and being axially movable therein, said valve plate normally occupying a seated position against said annular free end of said partition and cooperating with said partition, casing and integral wall, when in said seated position, to form adjacent one side thereof an annular fluid pressure inlet chamber encircling said partition and into which a fluid pressure inlet opens for admitting fluid under pressure thereinto and a control chamber surrounded by said partition so that the surface of said valve plate adjacent said inlet chamber is subjected to fluid pressure in the inlet chamber while the surface adjacent the control chamber is subjected to fluid pressure in the control chamber, said inlet and control chambers being in communication with each other through a restricted passageway in said partition, said restricted passageway being such that equalization of fluid pressure between said inlet chamber and said control chamber occurs upon build-up of fluid pressure in said inlet chamber, at a relatively slow rate while causing momentary fluid pressure surges to be dampened in said inlet chamber when said valve plate is in its seated position, said valve plate having an orifice extending from the side thereof adjacent the control chamber to the opposite side and opening into an outlet chamber formed by the casing, the valve plate and the removable end wall, said orifice being effective in the seated position of said valve plate to provide fluid pressure communication between said fluid pressure inlet and a fluid pressure outlet opening from said outlet chamber and through which reduction of fluid pressure in said outlet chamber may be effected, and spring means disposed in said casing and acting on said opposite side of said valve plate for urging it toward its seated position and being yieldable to a fluid pressure differential of predetermined degree between said one side and opposite side of said valve plate, as effected by relief of fluid pressure from said opposite side of the valve plate by reduction of fluid pressure in said outlet chamber, whereby such pressure differential also causes movement of said valve plate to a different position in which communication of relatively large capacity is established between said inlet and said outlet for effecting rapid dissipation of excessive fluid pressure from the system.

References Cited in the file of this patent

UNITED STATES PATENTS

| | | |
|---|---|---|
| 292,459 | Keller | Jan. 22, 1884 |
| 1,885,363 | Leitner | Nov. 1, 1932 |
| 2,214,290 | Ward | Sept. 10, 1940 |
| 2,367,662 | Baxter et al. | Jan. 23, 1945 |